United States Patent
Yang et al.

(10) Patent No.: US 11,949,630 B2
(45) Date of Patent: Apr. 2, 2024

(54) INFORMATION PROCESSING METHOD, DEVICE, EQUIPMENT, AND COMPUTER READABLE STORAGE MEDIUM

(71) Applicant: DATANG MOBILE COMMUNICATIONS EQUIPMENT CO., LTD., Beijing (CN)

(72) Inventors: Meiying Yang, Beijing (CN); Lei Wang, Beijing (CN); Jiaqing Wang, Beijing (CN); Chen Luo, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 357 days.

(21) Appl. No.: 17/415,888

(22) PCT Filed: Nov. 28, 2019

(86) PCT No.: PCT/CN2019/121531
§ 371 (c)(1),
(2) Date: Jun. 18, 2021

(87) PCT Pub. No.: WO2020/125369
PCT Pub. Date: Jun. 25, 2020

(65) Prior Publication Data
US 2022/0077995 A1 Mar. 10, 2022

(30) Foreign Application Priority Data
Dec. 20, 2018 (CN) .......................... 201811578135.0

(51) Int. Cl.
*H04W 72/23* (2023.01)
*H04L 5/00* (2006.01)
*H04L 27/26* (2006.01)

(52) U.S. Cl.
CPC .......... *H04L 5/0087* (2013.01); *H04L 5/0053* (2013.01); *H04L 5/0092* (2013.01); *H04L 27/2602* (2013.01); *H04W 72/23* (2023.01)

(58) Field of Classification Search
CPC ..... H04W 72/00; H04W 72/04; H04W 72/12; H04W 72/20; H04W 72/23;
(Continued)

(56) References Cited

U.S. PATENT DOCUMENTS 9,967,888 B1 5/2018 Zappaterra et al.
2013/0058294 A1 3/2013 Miki et al.
(Continued)

FOREIGN PATENT DOCUMENTS

CN 102934503 A 2/2013
CN 108282879 A 7/2018
(Continued)

OTHER PUBLICATIONS

Extended European Search Report dated Jan. 21, 2022 for Application No. EP 19 89 8561.6.
(Continued)

*Primary Examiner* — Matthew W Genack
(74) *Attorney, Agent, or Firm* — Harness, Dickey & Pierce, P.L.C.

(57) ABSTRACT

The embodiments of the present disclosure discloses an information processing method, a device, an equipment, and a computer readable storage medium. The information processing method of the present disclosure includes: sending first information to a terminal, wherein the first information is configured to indicate information of at least one time unit for scheduled data transmission; at least one piece of downlink control information (DCI) is sent in one time unit.

16 Claims, 2 Drawing Sheets

(58) Field of Classification Search
CPC .............. H04W 72/231; H04W 72/232; H04L 5/0053; H04L 5/0078; H04L 5/0087; H04L 5/0089; H04L 5/0092; H04L 5/0096; H04L 27/2601; H04L 27/2602
See application file for complete search history.

(56) References Cited

U.S. PATENT DOCUMENTS

| | | | |
|---|---|---|---|
| 2017/0302341 A1* | 10/2017 | Yu | H04B 7/0695 |
| 2018/0167959 A1* | 6/2018 | Liao | H04W 72/121 |
| 2018/0198894 A1 | 7/2018 | Nammi et al. | |
| 2018/0220400 A1 | 8/2018 | Nogami et al. | |
| 2018/0242296 A1 | 8/2018 | Li et al. | |
| 2019/0356459 A1 | 11/2019 | Wang et al. | |
| 2019/0357224 A1 | 11/2019 | Li et al. | |
| 2020/0022146 A1 | 1/2020 | Huangfu et al. | |
| 2020/0067676 A1 | 2/2020 | Yi | |
| 2020/0187236 A1 | 6/2020 | Moon et al. | |

FOREIGN PATENT DOCUMENTS

| | | |
|---|---|---|
| CN | 108282880 A | 7/2018 |
| CN | 108432307 A | 8/2018 |
| CN | 108631923 A | 10/2018 |
| KR | 20180081464 A | 7/2018 |
| WO | WO-2016/161581 A1 | 10/2016 |
| WO | WO-2017/066967 A1 | 4/2017 |
| WO | WO-2018/080260 A1 | 5/2018 |
| WO | WO-2018/203650 A1 | 11/2018 |

OTHER PUBLICATIONS

Sony, "Time Domain Structure of DL Physical Control Channel for NR", Agenda Item 7.1.4.1, 3GPP TSG RAN WG1 Meeting #87, R1-1612891, Nov. 14-18, 2016, Reno, Nevada, USA.
Chinese Office Action dated Nov. 25, 2020 for CN Application No. 201811578135.0.
Written Opinion and International Search Report for International Application No. PCT/CN2019/121531 dated Feb. 19, 2020.
Examination dated Sep. 20, 2023 in European Application No. 19898561.6.

* cited by examiner sending first information to a terminal, the first information is configured to indicate information of at least one time unit for scheduled data transmission; at least one piece of DCI is sent in one time unit ~101

Fig. 1 receiving first information sent by a network side device, wherein the first information is configured to indicate information of at least one time unit for scheduled data transmission; at least one piece of DCI of the network side device is sent in one time unit ~201

Fig. 2

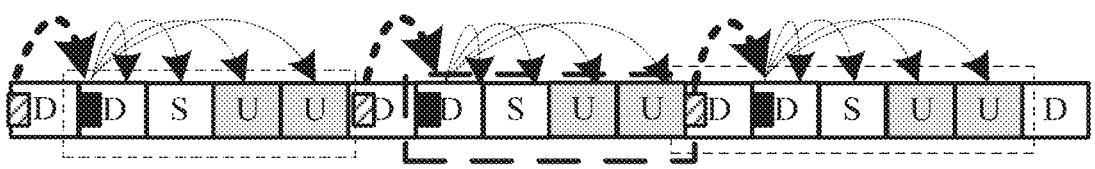

☐ Group-common DCI ■ UE-specific DCI

Fig. 3

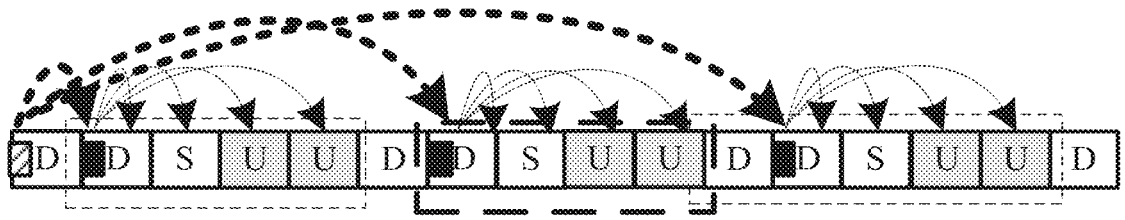

☐ Group-common DCI ■ UE-specific DCI

Fig. 4

INFORMATION PROCESSING METHOD, DEVICE, EQUIPMENT, AND COMPUTER READABLE STORAGE MEDIUM

CROSS-REFERENCE TO RELATED APPLICATIONS

This application is the U.S. national phase of PCT Application No. PCT/CN2019/121531 filed on Nov. 28, 2019 which claims priority to Chinese Patent Application No. 201811578135.0 filed on Dec. 20, 2018, the disclosures of which are incorporated in their entirety by reference herein.

TECHNICAL FIELD

The present disclosure relates to the field of communication technology, and in particular to an information processing method, a device, an equipment, and a computer readable storage medium.

BACKGROUND

With the development of wireless communication systems, terminal types and service types are diversified, and demands for terminal power saving, network resource saving and satisfying various types of services exist simultaneously. Among them, in the subframes following the physical downlink control channels (PDCCHs), the proportion of the monitoring power consumption of the PDCCHs without scheduling data can even reach more than 50% in some cases. By reducing this power consumption, the energy saving effect of the terminal can be greatly improved. Further, in the monitoring power consumption of the PDCCHs with data scheduling following the PDCCHs, if the number of times the terminal detects these PDCCHs can be further reduced, the detection power consumption can be further reduced. Based on this, the base station can use multi-slot scheduling, that is, only one slot is detected for the PDCCH, and the PDSCH/PUSCH transmission in multiple slots may be scheduled. By skipping the monitoring of the PDCCHs in the transmission slots of subsequent multiple physical downlink shared channels (PDSCHs)/physical uplink shared channels (PUSCHs), the terminal achieves the reduction of terminal power consumption.

Based on the above analysis, the scheduling of PDCCH in the related art is based on single-slot scheduling. In ultra reliability low latency communication (URLLC) applications, slot-aggregation is supported. Its main principle is to improve the transmission reliability of URLLC, so that the aggregated multiple slots transmit the same information, and the scheduling information is semi-statically configured. Obviously, this method is not suitable for general Enhance Mobile Broadband (eMBB) scenarios. This is because that the slot-aggregation loses the flexibility of scheduling, and it is also unable to adjust the scheduling result in time according to the time-varying characteristics of channels and services.

Further, the base station considers supporting multi-slot scheduling. In the Long Term Evolution (LTE) in the related art, for the UpLink (UL) Enhanced Licensed Assistant Access (eLAA), a downlink control information (DCI) format 0 B/4 B configuration has been added. In the two formats, for new data indication (NDI) and redundancy version (RV) indication, bits are added, which are used to configure information for multi-subframe scheduling. For other scheduling information, multiple subframes can be multiplexed. Considering the New Radio (NR), the multi-subframe scheduling mechanism of LTE can be multiplexed, and multi-slot information can be made to support multi-slot scheduling by adding bits. However, the method of directly adding bits requires adding a new DCI format or increasing the number of bits of an existing DCI format, which does not adapt the design principle of NR DCI.

Therefore, how to implement multi-slot scheduling on the basis of the NR DCI design of the related art to reduce the energy consumption of the terminal is a technical problem that needs to be solved.

SUMMARY

In view of this, the embodiments of the present disclosure provides an information processing method, a device, an equipment, and a computer readable storage medium to reduce the energy consumption of the terminal.

In order to solve the above problem, in a first aspect, an embodiment of the present disclosure provides an information processing method applied to a network equipment which includes:

sending first information to a terminal, the first information is configured to indicate information of at least one time unit for scheduled data transmission; at least one piece of downlink control information (DCI) is sent in one time unit.

Wherein, the sending the first information to the terminal includes:
sending first DCI to the terminal, the first DCI including the first information; or
sending an energy saving signal to the terminal, the energy saving signal including the first information.

Wherein, the first information is indicated by search space (SS) grouping information; or
the first information is indicated by a scrambling sequence; or
the first information is indicated by frozen bits; or
the first information is indicated by at least one time domain resource allocation (TDRA).

Wherein, the method further includes:
sending second DCI to the terminal, the second DCI including second information, the second information is configured to indicate whether to activate the first information; the first DCI and the second DCI are either group-common DCI or UE-specific DCI; or
sending the energy saving signal to the terminal, the energy saving signal includes second information, the second information is configured to indicate whether to activate the first information.

Wherein, the first information being indicated by the search space (SS) grouping information is: the first information being indicated by a grouping number of the SS;
the first information being indicated by frozen bits is: mapping the first information to the frozen bit according to a mapping rule, and indicating the first information by the frozen bit;
the TDRA includes an indication that at least one K0 is greater than zero; the first information being indicated by at least one time domain resource allocation (TDRA) includes:
indicating the first information by expanding an TDRA index; or indicating the first information by expanding TDRA bits.

Wherein, the first DCI and/or the second DCI carries scheduling information indicating data and/or information.

Wherein, a first time unit location where the first information is located is the same as an earliest location of a second time unit where the scheduling information is located, or the first time location is earlier than the second time location by at least one time unit.

Wherein, the first information is carried in one time unit, the time unit is slot-based or is subframe-based or is symbol-based; or
the first information includes first information of at least one terminal; or
a number of the first information is multiple.

In a second aspect, an embodiment of the present disclosure provides an information processing method applied to a terminal which includes:
receiving first information sent by a network side device, the first information indicating information of at least one time unit for scheduled data transmission; the network side device sending at least one piece of downlink control information (DCI) in one time unit.

Wherein, the receiving the first information sent by the network side device is:
receiving first DCI sent by the network side device, the first DCI including the first information; or
receiving an energy saving signal sent by the network side device, the energy saving signal including the first information.

Wherein, the first information is indicated by SS grouping information; or
the first information is indicated by a scrambling sequence; or
the first information is indicated by frozen bits; or
the first information is indicated by at least one TDRA.

Wherein, the method further includes:
receiving second DCI sent by the network side device, the second DCI includes second information, the second information is configured to indicate whether to activate the first information; the first DCI and the second DCI are either group-common DCI or UE-specific DCI; or
receiving the energy saving signal sent by the network side device, the energy saving signal includes second information, the second information is configured to indicate whether to activate the first information.

Wherein, when the first information is indicated by the SS grouping information, the receiving the first information sent by the network side device includes:
acquiring the first information by a grouping number of the SS;
when the first information is indicated by the scrambling sequence, the receiving the first information sent by the network side device includes: descrambling the scrambling sequence to acquire the first information;
when the first information is indicated by the frozen bits, the receiving the first information sent by the network side device includes:
acquiring the first information indicated by the frozen bits according to a mapping rule;
the TDRA includes an indication that at least one K0 is greater than zero; when the first information is indicated by at least one TDRA, the receiving the first information sent by the network side device includes:
parsing the first information indicated in either of the following ways so as to acquire the first information: the first information indicated by expanding an TDRA index; or the first information indicated by expanding TDRA bits.

Wherein, the first DCI and/or the second DCI carries scheduling information indicating data and/or information.

Wherein, a first time unit location where the first information is located is the same as an earliest location of a second time unit where the scheduling information is located, or the first time location is earlier than the second time location by at least one time unit.

Wherein, the method further includes:
when the second information indicates to activate the first information, performing data processing according to the first information and the scheduling information.

Wherein, the first information is carried in one time unit, the time unit is slot-based or is subframe-based or is symbol-based; or
the first information includes first information of at least one terminal; or
a number of the first information is multiple.

In a third aspect, an embodiment of the present disclosure provides an information processing apparatus which includes:
a first sending module configured to send first information to a terminal, the first information is configured to indicate information of at least one time unit for scheduled data transmission; at least one piece of downlink control information (DCI) is sent in one time unit.

Wherein, the first sending module is specifically configured to:
send first DCI to the terminal, the first DCI including the first information; or
send an energy saving signal to the terminal, the energy saving signal including the first information.

In a fourth aspect, an embodiment of the present disclosure provides an information processing apparatus which includes:
a first receiving module configured to receive first information sent by a network side device, the first information indicating information of at least one time unit for scheduled data transmission; the network side device sending at least one piece of downlink control information (DCI) in one time unit.

Wherein, the first receiving module is specifically configured to:
receive first DCI sent by the network side device, the first DCI including the first information; or
receive an energy saving signal sent by the network side device, the energy saving signal including the first information.

In a fifth aspect, an embodiment of the present disclosure provides an information processing equipment which includes: a transceiver, a storage, a processor, and a computer program stored on the storage and running on the processor;
the transceiver is configured to send first information to a terminal, the first information is configured to indicate information of at least one time unit for scheduled data transmission; at least one piece of downlink control information (DCI) is sent in one time unit.

Wherein, the transceiver is further configured to: send first DCI to the terminal, the first DCI including the first information; or send an energy saving signal to the terminal, the energy saving signal including the first information.

Wherein, the first information is indicated by SS grouping information; or
the first information is indicated by a scrambling sequence; or
the first information is indicated by frozen bits; or
the first information is indicated by at least one time domain resource allocation (TDRA).

Wherein, the transceiver is further configured to:
send second DCI to the terminal, the second DCI includes second information, the second information is configured to indicate whether to activate the first information; the first DCI and the second DCI are either group-common DCI or UE-specific DCI; or
send the energy saving signal to the terminal, the energy saving signal includes second information, the second information is configured to indicate whether to activate the first information.

Wherein, the processor is further configured to read the program in the storage, and perform following process:
indicating the first information by a grouping number of the SS; or
mapping the first information to the frozen bits according to a mapping rule, and indicating the first information by the frozen bits; or
the TDRA including an indication that at least one K0 is greater than zero; the processor is further configured to read the program in the storage, and perform following process:
indicating the first information by expanding an TDRA index; or indicating the first information by expanding TDRA bits.

Wherein, the first DCI and/or the second DCI carries scheduling information indicating data and/or information.

In a sixth aspect, an embodiment of the present disclosure provides an information processing equipment which includes: a transceiver, a storage, a processor, and a computer program stored on the storage and running on the processor;
the transceiver is configured to receive first information sent by a network side device, the first information indicates information of at least one time unit for scheduled data transmission; at least one piece of downlink control information (DCI) of the network side device is sent in one time unit.

Wherein, the transceiver is further configured to:
receive first DCI sent by the network side device, the first DCI including the first information; or
receive an energy saving signal sent by the network side device, the energy saving signal including the first information.

Wherein, the first information is indicated by SS grouping information; or
the first information is indicated by a scrambling sequence; or
the first information is indicated by frozen bits; or
the first information is indicated by at least one time domain resource allocation (TDRA).

Wherein, the transceiver is further configured to:
receive second DCI sent by the network side device, the second DCI includes second information, the second information is configured to indicate whether to activate the first information; the first DCI and the second DCI are either group-common DCI or UE-specific DCI; or
receive the energy saving signal sent by the network side device, the energy saving signal includes second information, the second information is configured to indicate whether to activate the first information.

Wherein, the processor is further configured to read the program in the storage, and perform following process:
acquiring the first information by a grouping number of the SS; or
the processor is further configured to read the program in the storage, and perform following process:

descrambling the scrambling sequence to acquire the first information; or
the processor is further configured to read the program in the storage, and perform following process:
acquiring the first information indicated by the frozen bits according to a mapping rule; or
the TDRA including an indication that at least one K0 is greater than zero; the processor is further configured to read the program in the storage, and perform following process:
parsing the first information indicated in either of the following ways so as to acquire the first information:
the first information indicated by expanding an TDRA index; or
the first information indicated by expanding TDRA bits.

In a seventh aspect, an embodiment of the present disclosure provides a computer readable storage medium for storing a computer program, the computer program performing, when executed by a processor, the steps in the method according to the first aspect; or, the computer program performing, when executed by a processor, the steps in the method according to the second aspect.

The beneficial effects of the above technical solutions of the embodiments of the present disclosure are as follows:
in the embodiments of the present disclosure, the network side device can send multiple pieces of DCIs in one time unit, and schedule the reception or transmission of data in subsequent multiple time units. Therefore, in this way, the terminal does not need to detect multiple time units, thereby reducing the energy consumption of the terminal.

BRIEF DESCRIPTION OF THE DRAWINGS

FIG. 1 is a flowchart of an information processing method according to an embodiment of the present disclosure;
FIG. 2 is a flowchart of an information processing method according to an embodiment of the present disclosure;
FIG. 3 is a schematic diagram of a relationship between first information and scheduling information according to an embodiment of the present disclosure;
FIG. 4 is a schematic diagram of a relationship between first information and scheduling information according to an embodiment of the present disclosure.

DETAILED DESCRIPTION

Figure 5:
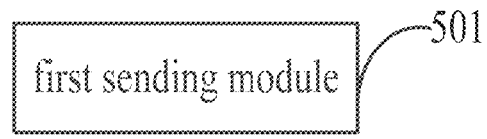
FIG. 5 is a schematic diagram of an information processing apparatus according to an embodiment of the present disclosure.

There are three main methods for NR scheduling in the related art: one is single-slot scheduling, the other is semi-persistent scheduling, and the third is slot-aggregation scheduling. Single slot scheduling: PDCCH is received in one slot, and in the scheduling information, the transmission and receiving of PDSCH/PUSCH of one slot is indicated. Semi-persistent scheduling: Radio Resource Control (RRC) semi-statically configures the scheduled time-frequency resources, the terminal receives the PDCCH at the activated PDCCH Mobile Originating (MO), and one PDCCH indicates the scheduling information of multiple slots. Among them, the RV version has RRC semi-persistent configuration, and for the activation fields of the PDCCH MO, the Hybrid auto retransmission query-identifier (HARQ-ID) is set to zero and the NDI is set to zero so as to achieve the activation of PDCCH. Slot-aggregation scheduling: time domain resources are configured by RRC, frequency domain resources are configured by PDCCH, and PDCCH scheduling information is used for scheduling of the next multiple slots.

In addition, LTE scheduling can support multi-subframe scheduling. The proposed background of the multi-subframe scheduling is based on eLAA UL PUSCH transmission, that is, the corresponding DCI format is 0 B/4 B. In eLAA multi-subframe scheduling, except for the NDI and the RV, all other scheduling information is shared by multiple subframes; the NDI and the RV of DCI format 0 B/4 B support information of multiple subframes by extending bits.

Based on the above analysis, the multi-subframe or multi-slot scheduling of the related art has the following problems:
the semi-persistent scheduling of NR has poor scheduling flexibility, multiple slots can only use the same time-frequency scheduling information and cannot adapt to changes in user services and channels;
the slot-aggregation of NR also has the above-mentioned problem; in addition, multiple slots are configured to send the same data information, which has a low resource utilization for eMBB scenarios;
the eLAA multi-subframe scheduling of LTE can only be applied to PUSCH scheduling first; secondly, new DCI configured to indicate multi-subframe scheduling needs to be added, which will increase the difficulty of standardization of the PDCCH DCI of NR.

Furthermore, for NR, considering supporting multi-subframe scheduling, and considering the solution of directly extending eLAA of LTE, that is, in the existing NR DCI, bits are added for indications of NDI and RV so as to configure multi-slot scheduling information. For other scheduling information, multiple slots can be multiplexed. However, there will be the following problems:
the method of directly adding the bits will bring greater difficulty to standardization, because it is necessary to add a new DCI format or increase the number of bits of an existing DCI format, which does not adapt the design principle of NR DCI.

In order to solve the above problems, an embodiment of the present disclosure proposes a multi-time unit scheduling scheme, the main idea of which is as follows:

When the base station is configured with multiple time units for scheduled data transmission, a network side device (such as the base station) can send at least one piece of DCI in one time unit, which is used for information of at least one time unit for scheduled data transmission (herein referred to as first information). Wherein, the number of the DCI is not less than the number of multiple pieces of time unit information for scheduled data transmission. Specifically, the base station may send the number of the multiple time units for scheduled data transmission to the terminal through a signal/channel that carries the first information for scheduled data transmission. Wherein, the signal of the first information for scheduled data transmission may be indicated based on Search space (SS) grouping; may be indicated by group-common DCI; it may also be that the group-common DCI indicates the first information for scheduled data transmission, and UE-specific DCI indicates whether to activate the first information; it may be indicated by a power saving signal; it may be indicated by a scrambling sequence; it may be indicated by frozen bits; it may also be indicated by Time Domain Resource Allocation (TDRA), and so on.

After receiving the indication information, the terminal may detect multiple pieces of DCI for scheduled data transmission according to the indication information, and acquire detailed scheduling information for each time unit.

Through this method, the base station can configure multi-slot scheduling, and the specific number of scheduled slots can be notified to the terminal. If the base station uses multiple time units for multiple DCI scheduling transmission, the terminal will detect multiple pieces of DCI information according to the number of slots, so that PDSCH reception or PUSCH transmission of multiple slots can be performed.

The specific implementations of the present disclosure will be described in further detail below in conjunction with the accompanying drawings and embodiments. The following embodiments are configured to illustrate the present disclosure, but not to limit the scope of the present disclosure.

As shown in FIG. 1, an information processing method of an embodiment of the present disclosure applied to a network side device includes:

Step 101, sending first information to a terminal, the first information is configured to indicate information of at least one time unit for scheduled data transmission; at least one piece of downlink control information (DCI) is sent in one time unit.

In an embodiment of the present disclosure, the first information may be sent to the terminal in either of the following ways:
sending first DCI to the terminal, the first DCI including the first information; or
sending an energy saving signal to the terminal, the energy saving signal including the first information.

Wherein, in the first DCI, the first information is indicated by SS grouping information; or, the first information is indicated by a scrambling sequence; or, the first information is indicated by frozen bits; or, the first information is indicated by at least one TDRA.

The first information being indicated by the SS grouping information is: the first information being indicated by a grouping number of the SS. For example, a remainder operation may be performed on the SS grouping number and a certain number, and the remainder is configured to indicate the first information; or, the SS may be numbered sequentially, grouped in ascending order, and the grouping number is configured to indicate the first information.

The first information being indicated by frozen bits is: mapping the first information to the frozen bits according to a mapping rule, and indicating the first information by the frozen bits. The mapping rule is not limited in the embodiment of the present disclosure, as long as the network side device and terminal know the mapping rule.

Specifically, the TDRA includes an indication that at least one K0 is greater than zero. The first information being indicated by at least one time domain resource allocation (TDRA) includes: indicating the first information by expanding an TDRA index; or indicating the first information by expanding TDRA bits.

Wherein, the first DCI may be group-common DCI or UE-specific DCI. In a practical application, the first DCI may also carry scheduling information indicating data and/or information.

In an embodiment of the present disclosure, the first information is carried in one time unit, this time unit is slot-based or is subframe-based or is symbol-based; or, the first information includes first information of at least one terminal; or, the number of the first information is multiple.

Moreover, in order to further save the energy consumption of the terminal, in the case that the terminal sends the first DCI, the method may further include:

sending second DCI to the terminal, the second DCI including second information, the second information is configured to indicate whether to activate the first information; the second DCI may be the group-common DCI or the UE-specific DCI; or, sending the energy saving signal to the terminal, the energy saving signal including second information, the second information is configured to indicate whether to activate the first information. Wherein, the order of sending the second DCI and the first DCI is not limited, and the order of sending the energy saving signal carrying the second information and the first DCI is not limited.

In a practical application, the second DCI may also carry scheduling information indicating data and/or information.

Wherein, a first time unit location where the first information is located is the same as an earliest location of a second time unit where the scheduling information is located, or the first time location is earlier than the second time location by at least one time unit.

After that, the network side device may perform data processing according to the first information and the scheduling information, such as sending PDSCH or receiving PUSCH.

In an embodiment of the present disclosure, the network side device may send multiple pieced of DCI in one time unit, and schedule data reception or transmission in subsequent multiple time units. Therefore, in this way, the terminal does not need to detect multiple time units, thereby reducing the energy consumption of the terminal.

As shown in FIG. 2, an information processing method of an embodiment of the present disclosure applied to a terminal includes:

Step 201, receiving first information sent by a network side device, the first information is configured to indicate information of at least one time unit for scheduled data transmission; at least one piece of downlink control information (DCI) of the network side device is sent in one time unit.

Specifically, in this step: receiving first DCI sent by the network side device, the first DCI including the first information; or, receiving an energy saving signal sent by the network side device, the energy saving signal including the first information.

Wherein, as for the indication manner of the first information, reference may be made to the description of the foregoing embodiment.

Wherein, the first information is carried in one time unit, this time unit is slot-based or is subframe-based or is symbol-based; or, the first information includes first information of at least one terminal; or, the number of the first information is multiple.

Specifically, when the first information is indicated by the SS grouping information, the first information is acquired by a grouping number of the SS.

Specifically, when the first information is indicated by the scrambling sequence, the first information is acquired by descrambling the scrambling sequence.

Specifically, when the first information is indicated by the frozen bits, the first information indicated by the frozen bits is acquired according to a mapping rule.

Specifically, the TDRA includes an indication that at least one K0 is greater than zero; when the first information is indicated by at least one TDRA, the first information is acquired by parsing the first information indicated by either of the following ways: the first information indicated by expanding an TDRA index; or the first information indicated by expanding TDRA bits.

Moreover, in order to further save the energy consumption of the terminal, the method may further include:

receiving second DCI sent by the network side device, the second DCI includes second information, the second information is configured to indicate whether to activate the first information; the first DCI and the second DCI are either group-common DCI or UE-specific DCI; or receiving the energy saving signal sent by the network side device, the energy saving signal includes second information, the second information is configured to indicate whether to activate the first information.

In an embodiment of the present disclosure, the first and/or the second DCI carry scheduling information indicating data and/or information.

In a specific application, when the second information indicates to activate the first information, the terminal performs data processing according to the first information and the scheduling information.

Wherein, a first time unit location where the first information is located is the same as an earliest location of a second time unit where the scheduling information is located, or the first time location is earlier than the second time location by at least one time unit.

In an embodiment of the present disclosure, the network side device may send multiple pieced of DCI in one time unit, and schedule data reception or transmission in subsequent multiple time units. Therefore, in this way, the terminal does not need to detect multiple time units, thereby reducing the energy consumption of the terminal.

Next, the specific solutions of the embodiments of the present disclosure will be described in combination with specific implementations.

Solution 1: the first information indicating scheduled data transmission is implicitly indicated by the SS grouping Step 31, the base station configuring the first information for scheduled data transmission. Specifically:

Wherein, the first information is configured to indicate the information of at least one time unit for scheduled data transmission. The first information is carried on one time unit, the time unit is slot-based or is subframe-based or is symbol-based, such as Orthogonal Frequency Division Multiplexing (OFDM), Single-carrier Frequency-Division Multiple Access (SC-OFDM).

The multiple scheduled time units indicated by the first information for scheduled data transmission may be continuous or discontinuous in time.

The time units where the first information for scheduled data transmission and the scheduling information are located may be continuous or discontinuous.

The scheduled data transmission may be scheduled downlink data/information transmission, may be scheduled uplink data/information transmission, and may be scheduled downlink data/information and uplink data/information transmission.

The first information includes at least one pieced of first information for scheduled data transmission. Wherein, the specific number of the first information for scheduled data transmission may be agreed upon by the base station and the terminal, or may be notified to the terminal by the base station.

In this embodiment, the first information for scheduled data transmission includes the first information of at least one terminal.

Specifically, the first information may be carried on the SS (which includes a UE-specific search space (USS) and a Cell-specific search space (CSS)).

In this embodiment, the first information is indicated by the SS grouping information.

Specifically, the numbers of SSs may be from 0 to 39. Through grouping, the SSs carry the first information for scheduled data transmission. For example, the numbers 0-9 identify the first information for scheduled data transmission as one time unit information; the numbers 10-19 identify the first information for scheduled data transmission as two time unit information; the numbers 20-29 identify the first information for scheduled data transmission is three time unit information; the numbers 30 to 39 identify the first information for scheduled data transmission as four time unit information.

For another example, perform a mathematical remainder operation on the SS number to obtain the remainder. For example, calculate the remainder between the SS number and the maximum number of scheduled multi-time units. For example, the maximum number of multi-time units is equal to four. When the remainder between the SS number and four are equal to zero, the first information for scheduled data transmission is identified as one time unit information; when the remainder between the SS number and four are equal to one, the first information for scheduled data transmission is identified as two time unit information; when the remainder between the SS number and four are equal to two, the first information for scheduled data transmission is identified as three time unit information; when the remainder between the SS number and four are equal to three, the first information for scheduled data transmission is identified as four time unit information.

Obviously, in practice, there can also be many ways to indicate the first information through the grouping number of the SS.

Step 32, the base station sending UE-specific DCI. Specifically:

In the time units for data transmission of the M scheduling time units of the terminal carried by the UE-specific DCI, the scheduling information of each time unit includes at least one DCI used for data scheduling. The M scheduling time units are indicated by the SS grouping in Step 31.

When there is one piece of UE-specific DCI, it is necessary to extend the bits for part of the scheduling indication information in the UE-specific DCI to support the scheduling information of multi-time units; for example, the NDI indication bit and the RV indication bit. When there are more than one piece of UE-specific DCI, one piece of UE-specific DCI can schedule scheduling information of one time unit for scheduled data transmission, and at least M pieces of UE-specific DCI are required to indicate the scheduling information of the M time units for scheduled data transmission.

Accordingly, the terminal receives the UE-specific DCI.

Step 33, the base station sending downlink data/information, or the base station receiving uplink data/information. Specifically:

the base station sending downlink data/information according to the indication of the UE-specific DCI in Step 32, or receiving uplink data/information.

Then, in this embodiment, the terminal acquires the first information indicated by the SS grouping, and performs data processing according to the indication of the first information and the UE-specific DCI.

Solution 2, the first information for scheduled data transmission is indicated by group-common DCI Step 41, the base station configuring the first information for scheduled data transmission.

For the specific process of configuring the first information, reference may be made to the description of configuring the first information in Step 31.

The difference is that, in this embodiment, the first information is indicated by the group-common DCI.

Step 42, the base station sending the group-common DCI.

The first information for scheduled data transmission may be carried on the group-common DCI. The group-common DCI includes information of at least one time unit for scheduled data transmission of at least one terminal.

The first scheduling information indicates at least one piece of first information for scheduled data transmission.

Accordingly, the terminal receives the group-common DCI.

As shown in FIGS. 3 and 4, they illustrates respectively that one piece of group-common DCI indicates the scheduling information of PDCCH of one time unit, and that one piece of group-common DCI indicates the scheduling information of PDCCH of multi-time units.

Step 43, the base station sending the UE-specific DCI.

For this step, reference may be made to the description of step 33. Accordingly, the terminal receives the UE-specific DCI.

Step 44, the base station sending downlink data/information, or the base station receiving uplink data/information.

The base station sends the downlink data/information according to the indication of the UE-specific DCI in Step 43, or receives the uplink data/information.

The first scheduling information is located at a first time unit location, and the second scheduling information is located at a second time unit location. The first time location and the second time location may be the same. The first time unit location may be earlier than the second time unit location. The first scheduling information may be the first information for scheduled data transmission indicated by the group-common DCI, the second scheduling information may be the scheduling information of one time unit for scheduled data transmission indicated by the UE-specific DCI.

Then, in this embodiment, the terminal acquires the first information indicated by the group-common DCI, and performs data processing according to the indication of the first information and the UE-specific DCI.

Solution 3, first information for scheduled data transmission is indicated by first DCI, and whether to activate the first information is indicated by second DCI Wherein, the first DCI and the second DCI may be either of the group-common DCI or the UE-specific DCI. Specifically, following steps are included:

Step 51, the base station configuring first information for scheduled data transmission.

Step 52, the base station sending the first DCI, the first DCI including the first information.

Accordingly, the terminal receives the first DCI.

Step 53, the base station sending the second DCI.

The second DCI includes second information, the second information is configured to indicate whether to activate the first information.

Accordingly, the terminal receives the second DCI.

Reference may be made to the description of foregoing Steps 41-43 for Steps 51-53. There is no strict precedence relationship between Step 52 and Step 53.

Step 54, the base station sending downlink data/information, or the base station receiving uplink data/information.

Reference may be made to the description of foregoing Step 44 for Step 54.

In the above embodiment, the first DCI and/or the second DCI may carry scheduling information indicating data and/or information.

Then, in this embodiment, the terminal acquires the first information indicated by the first DCI. If the first information is activated, the terminal performs data processing according to the first information and the scheduling information.

Specifically, if the second information indicates that the first information is activated, the terminal will send uplink data/information or receives downlink data/information according to the number of time unit information for scheduled data transmission indicated by the first DCI.

If the second information indicates that the first information is not activated, the terminal may not send uplink data/information or receive downlink data/information according to the number of time unit information for scheduled data transmission indicated by the first DCI. Then, at this time, the terminal may send uplink data/information or receive downlink data/information according to the time unit information for scheduled data transmission configured by higher layer signaling, or may send uplink data/information or receive downlink data/information according to single time unit scheduling, or the terminal may also send uplink data/information or receive downlink data/information according to the scheduled data transmission time agreed with the base station.

Taking an example that the group-common DCI indicates the first information for scheduled data transmission and the UE-specific DCI indicates whether to activate the first information, the following steps may be include:

Step 511, the base station configuring the first information for scheduled data transmission.

Step 512, the base station sending the group-common DCI.

Accordingly, the terminal receives the group-common DCI.

Step 531, the base station sending the UE-specific DCI.

Accordingly, the terminal receives the UE-specific DCI.

Reference may be made to the description of forgoing Steps 41-43 for Steps 511-531.

Furthermore, the UE-specific DCI may be configured to indicate whether to activate at least one piece of the first information for scheduled data transmission indicated by the group-common DCI.

Step 541, the base station sending downlink data/information, or the base station receiving uplink data/information.

Reference may be made to the description of foregoing Step 44 for Step 541.

Then, in this embodiment, the terminal acquires the first information indicated by the group-common DCI. If the first information is activated, the terminal performs data processing according to the first information and the UE-specific DCI.

Specifically, if it is determined according to the UE-specific DCI that the first information indicated by the group-common DCI is activated, the terminal will send uplink data/information or receives downlink data/information according to the number of time unit information for scheduled data transmission indicated by the group-common DCI.

it is determined according to the UE-specific DCI that the first information indicated by the group-common DCI is not activated, the terminal may not send uplink data/information or receive downlink data/information according to the number of time unit information for scheduled data transmission indicated by the group-common DCI. Then, at this time, the terminal may send uplink data/information or receive downlink data/information according to the time unit information for scheduled data transmission configured by higher layer signaling, or may send uplink data/information or receive downlink data/information according to single time unit scheduling, or the terminal may also send uplink data/information or receive downlink data/information according to the scheduled data transmission time agreed with the base station.

Solution 4, the first information for scheduled data transmission is indicated by a power saving signal Step 61, the base station configuring the first information for scheduled data transmission.

Step 62, the base station sending the power saving signal.

The first information for scheduled data transmission may be carried on the power saving signal. The power saving signal includes information of at least one time unit of data transmission of at least one terminal.

Accordingly, the terminal receives the power saving signal.

Step 63, the base station sending the UE-specific DCI.

Accordingly, the terminal receives the UE-specific DCI.

Step 64, the base station sending downlink data/information, or the base station receiving uplink data/information.

Specifically:

For the description of Steps 61, 63, 64, reference may be made to the forgoing description of Steps 41, 43, 44.

Then, in this embodiment, the terminal acquires the first information indicated by the power saving signal, and performs data processing according to the indication of the first information and the UE-specific DCI.

Solution 5, the first information for scheduled data transmission is indicated by a scrambling sequence Step 71, the base station configuring the first information for scheduled data transmission.

For this step, reference may be made to the forgoing description of Step 41.

Step 72, the base station sending DCI.

Accordingly, the terminal receives the DCI.

The first information for scheduled data transmission may be carried on the DCI. The DCI includes either of UE-specific DCI or group-common DCI.

Specifically, the base station sending the DCI may be the base station sending the group-common DCI; may be the base station sending the UE-specific DCI; may be the base station sending the group-common DCI before sending the UE-specific DCI; may be the base station sending both the group-common DCI and the UE-specific DCI.

The first information for scheduled data transmission includes information of at least one time unit for scheduled data transmission.

The first information for scheduled data transmission may be scrambled on the DCI in a manner of scrambling codes. Specifically, the scrambling codes may be a defined Radio Network Temporary Identity (RNTI) sequence agreed upon by the base station and the UE, and may be configured to the terminal by higher layer signaling. The RNTI may be a hexadecimal sequence of 0 to 65535.

Step 73, optionally, the base station sending the UE-specific DCI.

If the first information indicating scheduled data transmission has been scrambled and carried on the UE-specific DCI in Step 72 when the base station sends the DCI in Step 72, then Step 73 can be skipped, and Step 74 is performed in sequence.

A third scheduling information is located at a third time unit location, and a fourth scheduling information is located at a fourth time unit location. The third time unit location and the third time unit location may be the same. The third time unit location may be earlier than the fourth time unit location. The third scheduling information may be the first information for scheduled data transmission indicated by the DCI, the fourth scheduling information may be the scheduling information of one time unit for scheduled data transmission indicated by the UE-specific DCI.

The third scheduling information indicates at least one piece of first information for scheduled data transmission.

Optionally, the terminal receives the UE-specific DCI.

Step 74, the base station sending downlink data/information, or the base station receiving uplink data/information.

For this step, reference may be made to the forgoing description of Step 44.

Then, in this embodiment, the terminal descrambles the scrambled sequence, acquires the first information indicated thereby, and performs data processing according to the indication of the first information and the UE-specific DCI.

Solution 6, the first information for scheduled data transmission is indicated based on frozen bits Step 81, the base station configuring the first information for scheduled data transmission.

For this step, reference may be made to the description of Step 41.

Step 82, the base station sending DCI.

Accordingly, the terminal receives the DCI.

The first information for scheduled data transmission may be carried on the DCI, and the DCI includes either of UE-specific DCI or group-common DCI.

The base station sending the DCI may be the base station sending the group-common DCI; may be the base station sending the UE-specific DCI; may be the base station sending the group-common DCI before sending the UE-specific DCI; may be the base station sending both the group-common DCI and the UE-specific DCI.

The first information for scheduled data transmission includes information of at least one time unit for scheduled data transmission.

The first information for scheduled data transmission may be indicated by the frozen bits in the polar codes. The frozen bits are some zero-filled bits of the polar sequence. If the frozen bits are configured to indicate the first information for scheduled data transmission, a different bit mapping rule can be defined.

For example, 0011 represents three time unit information for scheduled data transmission, and thus 0011 can be mapped to the frozen bits.

The mapping rule may be agreed upon by the base station and the terminal, or may be notified to the terminal by the base station.

For example, the upper bit information of the first information for scheduled data transmission is indicated by a bit X, and the lower bit information of scheduling time unit information is indicated by a bit Y; for another example, the most significant bit of the first information for scheduled data transmission is indicated by a fixed bit A, the second most significant bit of the first information for scheduled data transmission is indicated by a fixed bit B, the third most significant bit of the first information for scheduled data transmission is indicated by a fixed bit C, and the fourth most significant bit of the first information for scheduled data transmission is indicated by a fixed bit D. Other mapping rules can also be applied in the embodiments of the present disclosure.

Step 83, optionally, the base station sending the UE-specific DCI.

If the first information indicating scheduled data transmission has been carried on the UE-specific DCI in Step 82 when the base station sends the DCI in Step 82, then Step 83 can be skipped, and Step 84 is performed in sequence. Optionally, the terminal receives the UE-specific DCI.

A fifth scheduling information is located at a fifth time unit location, and a sixth scheduling information is located at a sixth time unit location. The fifth time unit location and the sixth time unit location may be the same. The fifth time unit location may be earlier than the sixth time unit location. The fifth scheduling information may be the first information for scheduled data transmission indicated by the DCI, the sixth scheduling information may be the scheduling information of one time unit for scheduled data transmission indicated by the UE-specific DCI.

The fifth scheduling information indicates at least one piece of first information for scheduled data transmission.

Step 84, the base station sending downlink data/information, or the base station sending uplink data/information.

Reference may be made to the forgoing description of Step 44 for this step.

Then, in this embodiment, the terminal determines the first information indicated by the frozen bits according to the mapping rule, and performs data processing according to the indication of the first information and the UE-specific DCI.

Solution 7, cross-subframe scheduling is supported by configuring multiple TDRA entries Step 91, the base station configuring first information for scheduled data transmission.

The first information for scheduled data transmission includes at least one piece of time unit information of data transmission of at least one terminal, and may be carried on the DCI.

The first information for scheduled data transmission may be indicated by at least one TDRA, and the TDRA includes an indication that at least one K0 is greater than zero. Specifically, it is indicated in the TDRA that K0>0, K1>0; K0 represents the slot interval between PDCCH transmission and PDSCH transmission; K1 represents the number of slots between PDSCH transmission and acknowledgement (ACK) feedback.

The first information may be mapped to multi-time unit information through TDRA bitmap. For example, 4 bits correspond to locations of 16 slots. If a bit location is 1, it indicates that its corresponding slot locations are scheduled; otherwise, it indicates that the slot locations are not scheduled.

Or, it may be mapped to multi-time unit information by expanding an TDRA index. For example, 4 bits correspond to an entry of a TDRA list. The TDRA index entry list is mapped to K0s one-to-many, that is, one TDRX index entry list can correspond to multiple K0 values, thereby indicating the multi-time unit information.

Or, it may be indicated by directly expanding TDRA bits. For example, 4 bits identifies one K0 value, and 8 bits can identify two K0 values, and thus can indicate the scheduling of two slots.

Furthermore, the indicating the first information by the bitmap format may be configured by RRC signaling; corresponding the TDRA index to multiple K0s may be configured by RRC signaling; the expanding TDRA indication bits may be configured by RRC signaling.

Step 92, the base station sending DCI.

In the data transmission of the M scheduling time units of the terminal carried by the DCI, the scheduling information of each time unit includes at least one piece of DCI used for data scheduling. The M scheduling time units may be indicated by the network side device.

When the number of the UE-specific DCI is one, it is necessary to extend the bits for part of the scheduling indication information in the UE-specific DCI to support the scheduling information of multi-time units; for example, the NDI indication bit and the RV indication bit. When there are more than one piece of UE-specific DCI, one piece of UE-specific DCI can schedule scheduling information of one scheduled data transmission time unit, and at least M pieces of UE-specific DCI are required to indicate the scheduling information of the M scheduled data transmission time units.

Accordingly, the terminal receives the DCI.

Step 93, the base station sending downlink data/information, or the base station receiving uplink data/information.

The base station sends downlink data/information according to the indication of the UE-specific DCI in Step 92, or the base station receives uplink data/information.

Then, in this embodiment, the terminal parsing the first information indicated by the following information and performing data processing according to the indication of the first information and the UE-specific DCI includes:

parsing the first information indicated by TDRA bitmap or TDRA index or TDRA bits, and performing data processing according to the indication of the first information and the UE-specific DCI.

Based on the above analysis, compared with the related art or similar technologies, the embodiments of the present disclosure have the following advantageous:

compared with the information of the number of multiple slots semi-statically indicated in the NR, the embodiments of the present disclosure can dynamically configure the number of slots, and have a better scheduling flexibility; and it is more adaptable to changes in user services and channels. Compared with the slot-aggregation of the NR, multiple pieces of slot scheduling information are separately indicated by multiple pieces of DCI, which greatly improves resource utilization. Compared with the multi-subframe scheduling of eLAA of the LTE, the embodiments of the present disclosure can be applied not only to PUSCH scheduling, but also to PDSCH scheduling; secondly, the embodiments of the present disclosure may not change the number of the DCI used for scheduling in the related art, thereby reducing the complexity of PDCCH DCI standardization.

As shown in FIG. 5, an information processing apparatus of an embodiment of the present disclosure includes:

a first sending module 501 configured to send first information to a terminal, the first information is configured to indicate information of at least one time unit for scheduled data transmission; at least one piece of downlink control information (DCI) is sent on one time unit.

Wherein, the first sending module 501 is specifically configured to:

send first DCI to the terminal, the first DCI including the first information; or send an energy saving signal to the terminal, the energy saving signal including the first information.

Wherein, the first information is indicated by SS grouping information; or the first information is indicated by a scrambling sequence; or the first information is indicated by frozen bits; or the first information is indicated by at least one time domain resource allocation (TDRA).

Wherein the device may further include: a second sending module 502 configured to send second DCI to the terminal, the second DCI includes second information, the second information is configured to indicate whether to activate the first information; the first DCI and the second DCI being either group-common DCI or UE-specific DCI; or to send the energy saving signal to the terminal, the energy saving signal includes second information, the second information being configured to indicate whether to activate the first information.

Wherein, the first information being indicated by the SS grouping information is: the first information being indicated by a grouping number of the SS.

Wherein, the first information being indicated by the frozen bits is: mapping the first information to the frozen bits according to a mapping rule, and indicating the first information by the frozen bits.

Wherein the TDRA includes an indication that at least one K0 is greater than zero; the first information being indicated by at least one time domain resource allocation (TDRA) includes:

indicating the first information by expanding an TDRA index; or indicating the first information by expanding TDRA bits.

Wherein, the first DCI and/or the second DCI carries scheduling information indicating data and/or information.

Wherein, a first time unit location where the first information is located is the same as an earliest location of a second time unit where the scheduling information is located, or the first time location is earlier than the second time location by at least one time unit.

Wherein, the first information is carried in one time unit, the time unit is slot-based or is subframe-based or is symbol-based; or the first information includes first information of at least one terminal; or a number of the first information is multiple.

For the working principle of the device in the present disclosure, reference may be made to the description of the foregoing method embodiments.

In the embodiment of the present disclosure, multiple pieces of DCI can be sent in one time unit, and data reception or transmission in multiple subsequent time units can be scheduled. Therefore, in this way, the terminal does not need to detect multiple time units, thereby reducing the energy consumption of the terminal.

Figure 6:
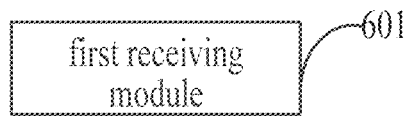
FIG. 6 is a schematic diagram of an information processing apparatus according to an embodiment of the present disclosure.

As shown in FIG. 6, an information processing apparatus of an embodiment of the present disclosure includes:

a first receiving module 601 configured to receive first information sent by a network side device, the first information indicating information of at least one time unit for scheduled data transmission; the network side device sending at least one piece of downlink control information (DCI) in one time unit.

Wherein, the first receiving module 601 is specifically configured to: receive first DCI sent by the network side device, the first DCI includes the first information; or receive an energy saving signal sent by the network side device, the energy saving signal includes the first information.

Wherein, the first information is indicated by SS grouping information; or the first information is indicated by a scrambling sequence; or the first information is indicated by frozen bits; or the first information is indicated by at least one time domain resource allocation (TDRA).

Wherein, the device may further include: a second receiving module 602 configured to receive second DCI sent by the network side device, the second DCI includes second information, the second information being configured to indicate whether to activate the first information; the first DCI and the second DCI being either group-common DCI or UE-specific DCI; or to receive the energy saving signal sent by the network side device, the energy saving signal includes second information, the second information being configured to indicate whether to activate the first information.

Wherein, when the first information is indicated by the SS grouping information, the first receiving module 601 is specifically configured to: acquire the first information by a grouping number of the SS.

Wherein, when the first information is indicated by the scrambling sequence, the first receiving module 601 is specifically configured to: descramble the scrambling sequence to acquire the first information.

Wherein, when the first information is indicated by the frozen bits, the first receiving module 601 is specifically configured to: acquire the first information indicated by the frozen bits according to a mapping rule.

Wherein, the TDRA includes an indication that at least one K0 is greater than zero; when the first information is indicated by at least one TDRA, the first receiving module 601 is specifically configured to parse the first information indicated in either of the following ways so as to acquire the first information: the first information indicated by expanding an TDRA index; or the first information indicated by expanding TDRA bits.

Wherein, the first DCI and/or the second DCI carries scheduling information indicating data and/or information.

Wherein, a first time unit location where the first information is located is the same as an earliest location of a second time unit where the scheduling information is located, or the first time location is earlier than the second time location by at least one time unit.

Wherein, the device may further include: a processing module 603 configured to perform data processing according to the first information and the scheduling information when the second information indicates to activate the first information.

Wherein, the first information is carried in one time unit, the time unit is slot-based or is subframe-based or is symbol-based; or the first information includes first information of at least one terminal; or a number of the first information is multiple.

For the working principle of the device in the present disclosure, reference may be made to the description of the foregoing method embodiments.

In the embodiment of the present disclosure, multiple pieces of DCI can be sent in one time unit, and data reception or transmission in multiple subsequent time units can be scheduled. Therefore, in this way, the terminal does not need to detect multiple time units, thereby reducing the energy consumption of the terminal.

Figure 7:
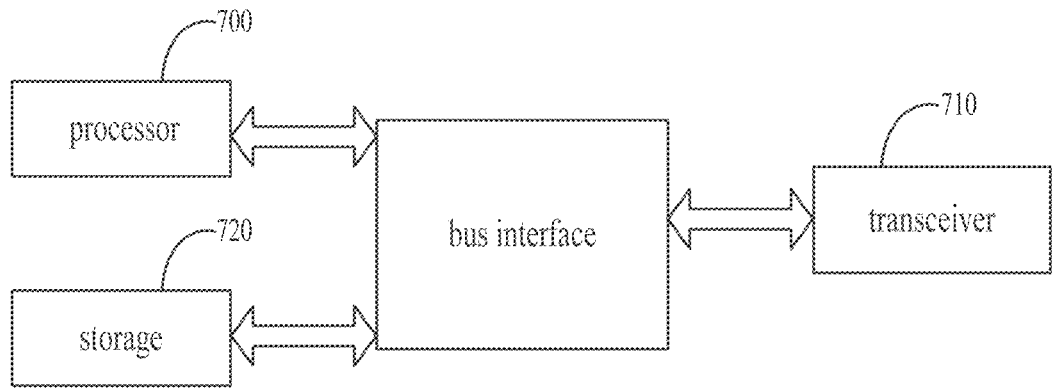
FIG. 7 is a schematic diagram of an information processing equipment according to an embodiment of the present disclosure.

As shown in FIG. 7, an information processing equipment of an embodiment of the present disclosure includes:
a processor 700 configured to read a program in a storage 720 and perform the following process: sending first information to a terminal via a transceiver 710, the first information being configured to indicate information of at least one time unit for scheduled data transmission; at least one piece of downlink control information (DCI) being sent in one time unit;
the transceiver 710 being configured to receive and send data under the control of the processor 700.

Wherein, in FIG. 7, the bus architecture may include any number of interconnected buses and bridges which are linked together specifically by various circuits such as one or more processors represented by the processor 700 and the storage represented by the storage 720. The bus architecture can also link various other circuits such as peripheral devices, voltage regulators, and power management circuits, etc., which are well known in the art, and therefore, they will not be further described herein. The bus interface provides interfaces. The transceiver 710 may be a plurality of elements, including a transmitter and a receiver, and provides units for communicating with various other devices on a transmission medium. The processor 700 is responsible for managing the bus architecture and general processing, and the storage 720 may store data used by the processor 700 when performing operations.

The processor 700 is responsible for managing the bus architecture and general processing, and the storage 720 may store data used by the processor 700 when performing operations.

The transceiver 710 is further configured to send first DCI to the terminal, the first DCI includes the first information; or send an energy saving signal to the terminal, the energy saving signal includes the first information.

Wherein, the first information is indicated by SS grouping information; or the first information is indicated by a scrambling sequence; or the first information is indicated by frozen bits; or the first information is indicated by at least one time domain resource allocation (TDRA).

The transceiver 710 is further configured to: send second DCI to the terminal, the second DCI includes second information, the second information being configured to indicate whether to activate the first information; the first DCI and the second DCI being either group-common DCI or UE-specific DCI; or send the energy saving signal to the terminal, the energy saving signal includes second information, the second information being configured to indicate whether to activate the first information.

The processor 700 is further configured to read the computer program, and perform following step: indicating the first information by a grouping number of the SS.

The processor 700 is further configured to read the computer program, and perform following step:
mapping the first information to the frozen bits according to a mapping rule, and indicating the first information by the frozen bits.

The TDRA includes an indication that at least one K0 is greater than zero; the processor 700 is further configured to read the computer program, and perform following step:
indicating the first information by expanding an TDRA index; or
indicating the first information by expanding TDRA bits.

Wherein, the first DCI and/or the second DCI carries scheduling information indicating data and/or information.

Wherein, a first time unit location where the first information is located is the same as an earliest location of a second time unit where the scheduling information is located, or the first time location is earlier than the second time location by at least one time unit.

Wherein, the first information is carried in one time unit, the time unit is slot-based or is subframe-based or is symbol-based; or the first information includes first information of at least one terminal; or a number of the first information is multiple.

Figure 8:
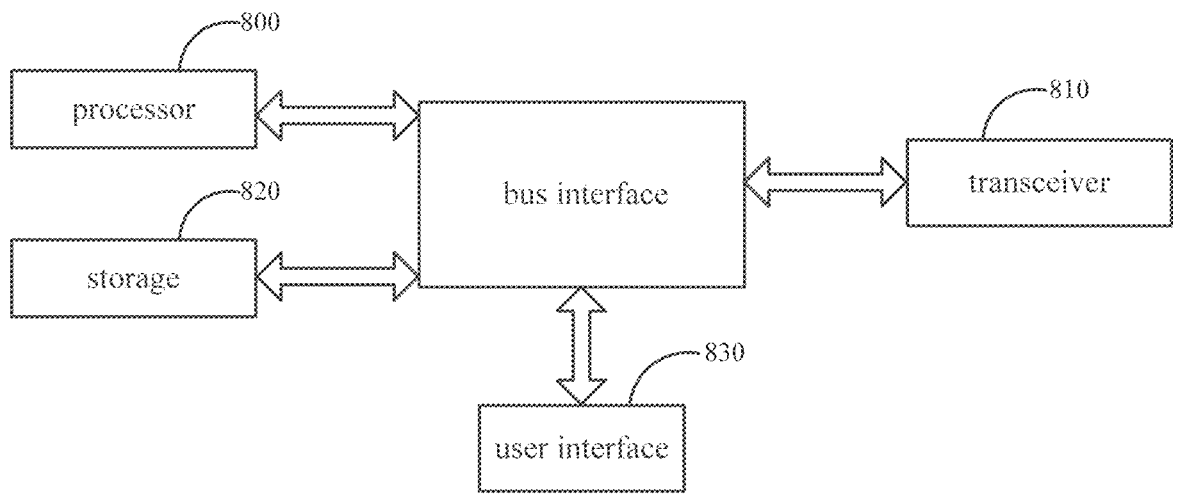
FIG. 8 is a schematic diagram of an information processing equipment according to an embodiment of the present disclosure.

As shown in FIG. 8, an information processing equipment of an embodiment of the present disclosure includes:

a processor 800 configured to read a program in a storage 820 and perform the following process:

receiving first information sent by a network side device via a transceiver 810, the first information being configured to indicate information of at least one time unit for scheduled data transmission; the network side device sending at least one piece of downlink control information (DCI) in one time unit.

The transceiver 810 is configured to receive and send data under the control of the processor 800.

Wherein, in FIG. 8, the bus architecture may include any number of interconnected buses and bridges which are linked together specifically by various circuits such as one or more processors represented by the processor 800 and the storage represented by the storage 820. The bus architecture can also link various other circuits such as peripheral devices, voltage regulators, and power management circuits, etc., which are well known in the art, and therefore, they will not be further described herein. The bus interface provides interfaces. The transceiver 810 may be a plurality of elements, including a transmitter and a receiver, and provides units for communicating with various other devices on a transmission medium. For different user devices, the user interface 830 may also be an interface capable of connecting externally and internally with the required devices. The connected devices include but not limited to a keypad, a display, a speaker, a microphone, a joystick, and the like.

The processor 800 is responsible for managing the bus architecture and general processing, and the storage 820 may store data used by the processor 800 when performing operations.

The transceiver 810 is further configured to receive first DCI sent by the network side device, the first DCI includes the first information; or to receive an energy saving signal sent by the network side device, the energy saving signal includes the first information.

Wherein, the first information is indicated by SS grouping information; or the first information is indicated by a scrambling sequence; or the first information is indicated by frozen bits; or the first information is indicated by at least one time domain resource allocation (TDRA).

The transceiver is further configured to: receive second DCI sent by the network side device, the second DCI includes second information, the second information being configured to indicate whether to activate the first information; the first DCI and the second DCI being either group-common DCI or UE-specific DCI; or receive the energy saving signal sent by the network side device, the energy saving signal includes second information, the second information being configured to indicate whether to activate the first information.

The processor 800 is further configured to read the computer program and perform the following step:
acquiring the first information by a grouping number of the SS.

The processor 800 is further configured to read the computer program and perform the following step:
descrambling the scrambling sequence to acquire the first information.

The processor 800 is further configured to read the computer program and perform the following step:
acquiring the first information indicated by the frozen bits according to a mapping rule.

The TDRA includes an indication that at least one K0 is greater than zero; the processor 800 is further configured to read the computer program and perform the following step:
parsing the first information indicated in either of the following ways so as to acquire the first information:
the first information indicated by expanding an TDRA index; or the first information indicated by expanding TDRA bits.

Wherein, the first DCI and/or the second DCI carries scheduling information indicating data and/or information.

Wherein, the processor 800 is further configured to read the computer program and perform the following step:
when the second information indicates to activate the first information, performing data processing according to the first information and the scheduling information.

Wherein, the first information is carried in one time unit, the time unit is slot-based or is subframe-based or is symbol-based; or the first information includes first information of at least one terminal; or a number of the first information is multiple.

Furthermore, a computer readable storage medium of an embodiment of the present disclosure is configured to store a computer program, and the computer program can perform, when executed by a processor, the following step:
sending first information to a terminal, the first information being configured to indicate information of at least one time unit for scheduled data transmission;
at least one piece of downlink control information (DCI) being sent in one time unit.

Wherein, the sending the first information to the terminal includes:
sending first DCI to the terminal, the first DCI includes the first information; or
sending an energy saving signal to the terminal, the energy saving signal includes the first information.

Wherein, the first information is indicated by SS grouping information; or
the first information is indicated by a scrambling sequence; or
the first information is indicated by frozen bits; or
the first information is indicated by at least one time domain resource allocation (TDRA).

Wherein, sending second DCI to the terminal, the second DCI includes second information, the second information being configured to indicate whether to activate the first information; the first DCI and the second DCI being either group-common DCI or UE-specific DCI; or
sending the energy saving signal to the terminal, the energy saving signal includes second information, the second information being configured to indicate whether to activate the first information.

Wherein, the first information being indicated by the SS grouping information is: the first information being indicated by a grouping number of the SS.

Wherein, the first information being indicated by the frozen bits is:
mapping the first information to the frozen bits according to a mapping rule, and indicating the first information by the frozen bits.

Wherein the TDRA includes an indication that at least one K0 is greater than zero;
the first information being indicated by at least one time domain resource allocation (TDRA) includes:
indicating the first information by expanding an TDRA index; or
indicating the first information by expanding TDRA bits.

Wherein, the first DCI and/or the second DCI carries scheduling information indicating data and/or information.

Wherein, a first time unit location where the first information is located is the same as an earliest location of a second time unit where the scheduling information is located, or the first time location is earlier than the second time location by at least one time unit.

Wherein, the first information is carried in one time unit, the time unit is slot-based or is subframe-based or is symbol-based; or
the first information includes first information of at least one terminal; or
a number of the first information is multiple.

Furthermore, a computer readable storage medium of an embodiment of the present disclosure is configured to store a computer program, and the computer program can perform, when executed by a processor, the following step:
receiving first information sent by a network side device, the first information being configured to indicate information of at least one time unit for scheduled data transmission; the network side device sending at least one piece of downlink control information (DCI) in one time unit.

Wherein, the receiving the first information sent by the network side device is:
receiving first DCI sent by the network side device, the first DCI includes the first information; or
receiving an energy saving signal sent by the network side device, the energy saving signal includes the first information.

Wherein, the first information is indicated by search space (SS) grouping information; or the first information is indicated by a scrambling sequence; or the first information is indicated by frozen bits; or the first information is indicated by at least one TDRA.

Wherein, the method further includes:
receiving second DCI sent by the network side device, the second DCI includes second information, the second information being configured to indicate whether to activate the first information; the first DCI and the second DCI are either group-common DCI or UE-specific DCI; or
receiving the energy saving signal sent by the network side device, the energy saving signal includes second information, the second information being configured to indicate whether to activate the first information.

Wherein, when the first information is indicated by the SS grouping information, the receiving the first information sent by the network side device includes:
acquiring the first information by a grouping number of the SS.

Wherein, when the first information is indicated by the scrambling sequence, the receiving the first information sent by the network side device includes: descrambling the scrambling sequence to acquire the first information.

Wherein, when the first information is indicated by the frozen bits, the receiving the first information sent by the network side device includes:
acquiring the first information indicated by the frozen bits according to a mapping rule.

Wherein, the TDRA includes an indication that at least one K0 is greater than zero;
when the first information is indicated by at least one TDRA, the receiving the first information sent by the network side device includes:
parsing the first information indicated in either of the following ways so as to acquire the first information:
the first information indicated by expanding an TDRA index; or
the first information indicated by expanding TDRA bits.

Wherein, the first DCI and/or the second DCI carries scheduling information indicating data and/or information.

Wherein, a first time unit location where the first information is located is the same as an earliest location of a second time unit where the scheduling information is located, or the first time location is earlier than the second time location by at least one time unit.

Wherein, the method further includes:
when the second information indicates to activate the first information, performing data processing according to the first information and the scheduling information.

Wherein, the first information is carried in one time unit, the time unit is slot-based or is subframe-based or is symbol-based; or the first information includes first information of at least one terminal; or a number of the first information is multiple.

A person of ordinary skill in the art can recognize that the units and algorithm steps of the examples described in combination with the embodiments disclosed herein can be implemented by electronic hardware or a combination of computer software and electronic hardware. Whether these functions are executed by hardware or software depends on the specific applications and design constraint conditions of the technical solution. Professionals and technicians can use different methods for each specific application to implement the described functions, but such implementation should not be considered as going beyond the scope of the present disclosure.

Those skilled in the art can clearly understand that, for the convenience and conciseness of description, the specific working processes of the above-described systems, devices, and units, reference may be made to the corresponding processes in the foregoing method embodiments, which will not be repeated here.

In the several embodiments provided in this application, it will be appreciated that the disclosed methods and devices can be implemented in other ways. For example, the device embodiments described above are only illustrative. For example, the division of the units is only a logical function division, and there may be other divisions in practical implementations, for example, multiple units or components may be combined or may be integrated into another system, or some elements can be ignored or not implemented. In addition, the displayed or discussed mutual coupling or direct coupling or communication connection may be indirect coupling or communication connection via some interfaces, devices or units, and may be in electrical, mechanical or other forms.

The units described as separate components may or may not be physically separated, and the components shown as units may or may not be physical units, that is, they may be located in one place, or they may be distributed on multiple network units. Some or all of the units may be selected according to actual needs to achieve the objects of the solutions of the embodiments.

In addition, the functional units in the various embodiments of the present disclosure may be integrated into one processing unit, or each unit may be separately physically included, or two or more units may be integrated into one unit. The above integrated unit may be implemented in the form of hardware, or may be implemented in the form of hardware plus software functional units.

If the function is implemented in the form of a software functional unit and sold or used as an independent product, it can be stored in a computer readable storage medium. Based on this understanding, the technical solutions of the present disclosure essentially or the part that contributes to the related art or a part of the technical solutions can be embodied in the form of a software product, and the computer software product is stored in a storage medium, including several instructions that are configured to make a computer device (which may be a personal computer, a server, or a network device, etc.) execute all or part of the steps of the methods described in the various embodiments of the present disclosure. The above storage medium includes various media that can store program codes, such as a USB flash drive, a mobile hard disk, a ROM, a RAM, a magnetic disk or an optical disk, and so on.

A person of ordinary skill in the art can understand that all or part of the processes in the above embodiment methods can be implemented by controlling the relevant hardware through a computer program. The program can be stored in a computer readable storage medium. When executed, it may include the procedures of the above method embodiments. Wherein, the storage medium may be a magnetic disk, an optical disc, a Read-Only Memory (ROM), a Random Access Memory (RAM), etc.

It will be appreciated that the embodiments described in the embodiments of the present disclosure can be implemented by hardware, software, firmware, middleware, microcodes, or a combination thereof. For hardware implementations, the processing unit can be implemented in one or more Application Specific Integrated Circuits (ASIC), digital signal processors (DSPs), DSP Devices (DSPDs), programmable Logic Devices (PLDs), Field-Programmable Gate Arrays (FPGAs), general-purpose processors, controllers, microcontrollers, microprocessors, and other electronic units for performing the functions described in this disclosure, or combinations thereof.

For software implementations, the technology described in the embodiments of the present disclosure can be implemented through modules (for example, procedures, functions, etc.) that perform the functions described in the embodiments of the present disclosure. The software codes can be stored in the storage and executed by the processor. The storage can be implemented in the processor or external to the processor.

The above integrated unit implemented in the form of a software functional unit may be stored in a computer readable storage medium. The above software functional unit is stored in a storage medium, including several instructions to make a computer device (which may be a personal computer, a server, or a network device, etc.) execute part of the steps of the sending-receiving methods described in the various embodiments of the present disclosure. The above storage medium includes various media that can store program codes, such as a USB flash drive, a mobile hard disk, a Read-Only Memory (ROM), a Random Access Memory (RAM), a magnetic disk or an optical disk, etc.

The above are alternative implementations of the present disclosure. It should be noted that, for those of ordinary skill in the art, without departing from the principle of the present disclosure, many improvements and modifications can be made. These improvements and modifications should also be regarded as the protection scope of the present disclosure.

What is claimed is:

1. An information processing method, applied to a network side device, comprising:
   sending first information to a terminal, wherein the first information is configured to indicate information of at least one time unit for scheduled data transmission; at least one piece of downlink control information (DCI) is sent in one time unit, wherein the sending the first information to the terminal includes:
   sending first DCI to the terminal, the first DCI comprising the first information; or
   sending an energy saving signal to the terminal, the energy saving signal comprising the first information;
   wherein the method further comprises:
   sending second DCI to the terminal, wherein the second DCI comprises second information, the second information is configured to indicate whether to activate the first information; the first DCI and the second DCI are either group-common DCI or UE-specific DCI; or
   sending the energy saving signal to the terminal, wherein the energy saving signal comprises second information, the second information is configured to indicate whether to activate the first information.

2. The method according to claim 1, wherein,
   the first information is indicated by search space (SS) grouping information; or
   the first information is indicated by a scrambling sequence; or
   the first information is indicated by frozen bits; or
   the first information is indicated by at least one time domain resource allocation (TDRA).

3. The method according to claim 2, wherein the first information being indicated by the search space (SS) grouping information is: the first information being indicated by a grouping number of the SS;
   the first information being indicated by frozen bits is: mapping the first information to the frozen bits according to a mapping rule, and indicating the first information by the frozen bits;
   the TDRA comprises an indication that at least one K0 is greater than zero; the first information being indicated by at least one time domain resource allocation (TDRA) comprises:
   indicating the first information by expanding an TDRA index; or indicating the first information by expanding TDRA bits.

4. The method according to claim 1, wherein,
   the first DCI and/or the second DCI carries scheduling information indicating data and/or information.

5. The method according to claim 4, wherein,
   a first time unit location where the first information is located is the same as an earliest location of a second time unit where the scheduling information is located, or the first time location is earlier than the second time location by at least one time unit.

6. The method according to claim 1, wherein,
   the first information is carried in one time unit, the time unit is slot-based or is subframe-based or is symbol-based; or
   the first information comprises first information of at least one terminal; or
   a number of the first information is multiple.

7. An information processing equipment, comprising: a transceiver, a storage, a processor, and a computer program stored on the storage and running on the processor; the computer program performing, when executed by the processor, the steps in the method according to claim 1.

8. A non-transitory computer readable storage medium for storing a computer program, the computer program performing, when executed by a processor, the steps in the method according to claim 1.

9. An information processing method, applied to a terminal, comprising:
  receiving first information sent by a network side device, the first information is configured to indicate information of at least one time unit for scheduled data transmission; at least one piece of downlink control information (DCI) of the network side device is sent in one time unit, wherein the receiving the first information sent by the network side device incudes:
    receiving first DCI sent by the network side device, the first DCI comprising the first information; or
    receiving an energy saving signal sent by the network side device, the energy saving signal comprising the first information;
  wherein the method further comprises:
    receiving second DCI sent by the network side device, wherein the second DCI comprising second information, the second information is configured to indicate whether to activate the first information; the first DCI and the second DCI are either group-common DCI or UE-specific DCI; or
    receiving the energy saving signal sent by the network side device, wherein the energy saving signal comprises second information, the second information is configured to indicate whether to activate the first information.

10. The method according to claim 9, wherein,
  the first information is indicated by search space (SS) grouping information; or
  the first information is indicated by a scrambling sequence; or
  the first information is indicated by frozen bits; or
  the first information is indicated by at least one time domain resource allocation (TDRA).

11. The method according to claim 10, wherein, when the first information is indicated by the SS grouping information, the receiving the first information sent by the network side device comprises:
  acquiring the first information by a grouping number of the SS;
  when the first information is indicated by the scrambling sequence, the receiving the first information sent by the network side device comprises: descrambling the scrambling sequence to acquire the first information;
  when the first information is indicated by the frozen bits, the receiving the first information sent by the network side device comprises:
  acquiring the first information indicated by the frozen bits according to a mapping rule;
  the TDRA comprises an indication that at least one K0 is greater than zero; when the first information is indicated by at least one TDRA, the receiving the first information sent by the network side device comprises:
  parsing the first information indicated in either of the following ways so as to acquire the first information: the first information indicated by expanding an TDRA index; or the first information indicated by expanding TDRA bits.

12. The method according to claim 2, wherein the first DCI and/or the second DCI carries scheduling information indicating data and/or information.

13. The method according to claim 12, wherein,
  a first time unit location where the first information is located is the same as an earliest location of a second time unit where the scheduling information is located, or the first time location is earlier than the second time location by at least one time unit.

14. The method according to claim 12, further comprising:
  when the second information indicates to activate the first information, performing data processing according to the first information and the scheduling information.

15. The method according to claim 9, wherein,
  the first information is carried in one time unit, the time unit is slot-based or is subframe-based or is symbol-based; or
  the first information comprises first information of at least one terminal; or
  a number of the first information is multiple.

16. An information processing equipment, comprising: a transceiver, a storage, a processor, and a computer program stored on the storage and running on the processor; the computer program performing, when executed by the processor, the steps in the method according to claim 9.

* * * * *